(12) United States Patent
Yuan

(10) Patent No.: US 8,260,383 B2
(45) Date of Patent: Sep. 4, 2012

(54) SLIDE MECHANISM FOR SLIDE-TYPE TERMINAL DEVICE

(75) Inventor: Li-Jun Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 979 days.

(21) Appl. No.: 12/261,217

(22) Filed: Oct. 30, 2008

(65) Prior Publication Data

US 2009/0305754 A1   Dec. 10, 2009

(30) Foreign Application Priority Data

Jun. 10, 2008   (CN) .......................... 2008 1 0302089

(51) Int. Cl.
*H04M 1/00*   (2006.01)
(52) U.S. Cl. .............................. 455/575.4; 379/433.12
(58) Field of Classification Search ............... 455/575.4; 379/428–433
See application file for complete search history.

(56) References Cited

U.S. PATENT DOCUMENTS

| 7,343,182 B2 * | 3/2008 | Wu ............................ 455/575.4 |
| 8,032,192 B2 * | 10/2011 | Park .......................... 455/575.4 |
| 8,108,014 B2 * | 1/2012 | Demuynck ................ 455/575.1 |
| 2005/0113154 A1 | 5/2005 | Park et al. |

FOREIGN PATENT DOCUMENTS

| CN | 2932849 Y | 8/2007 |
| TW | 497795 | 8/2002 |
| TW | M260061 | 3/2005 |

* cited by examiner

*Primary Examiner* — Simon Sing
(74) *Attorney, Agent, or Firm* — Altis Law Group, Inc.

(57) ABSTRACT

A slide mechanism includes a rear cover, a front cover slidably attached to the rear cover, a resilient member for creating an elastic force to make the front cover slide relative to the rear cover, and an operating module. The resilient member is connected between the rear cover and the front cover. The operating module includes a first latching member rotatably connected to the rear cover, a tension spring, an operating member, and a second latching member fixed to the front cover. The operating member is sleeved by the tension spring and includes a pressing portion at an end for pressing the first latching member to rotate. The second latching member is latched with the first latching member after the first latching member is rotated by an elastic force created by the tension spring and unlatched with the latching member after the latching member is rotated by the operating member.

20 Claims, 6 Drawing Sheets

SLIDE MECHANISM FOR SLIDE-TYPE TERMINAL DEVICE

BACKGROUND

1. Technical Field

The present disclosure relates to slide mechanisms and, particularly, to a slide mechanism for a slide-type terminal device.

2. Description of the Related Art

Slide mechanisms are widely used in slide-type terminal devices, such as slide-type mobile phones and slide-type personal digital assistants (PDAs). A typical slide-type terminal device generally includes two housings. One housing slides over the other housing, thereby opening or closing the terminal device.

Referring to FIG. 6, a typical slide mechanism generally includes a first sheet 11, a second sheet 12, and a sliding module 13 for linking the first and the second sheets 11, 12. The first sheet 11 is slidable relative to the second sheet 12. The first and the second sheets 11, 12 are fixed on a display unit and a main unit of the typical slide-type terminal device. The sliding module 13 includes a first linking member 131, a first pivot shaft 132, a second linking member 133, a second pivot shaft 134, a first sliding sleeve 136, a second sliding sleeve 138, and a spring 139. The first linking member 131 is rotatably attached to the first sheet 11 by the first pivot shaft 132, and the second linking member 133 is rotatably attached to the second sheet 12 by the second pivot shaft 134. An end of the first sliding sleeve 136 is fixed to the first linking member 131, and an end of the second sliding sleeve 138 is fixed to the second linking member 133. Another end of the second sliding sleeve 138 opposite to the second linking member 133 is inserted into the first sliding sleeve 136. The spring 139 is received in the first and second sliding sleeves 136, 138. A first end of the spring 139 is fixed to the first linking member 131 and a second end of the spring 139 opposite to the first end is fixed to the second linking member 133.

When the display unit is in a closed position, the first sheet 11 is positioned at a first end of the second sheet 12 and the spring 139 is slightly compressed. In an opening process, the display unit is slid opened by an external force from the main unit, the first sheet 11 moves towards a second end opposite to the first end of the second sheet 12, the spring 139 gradually compresses thereby accumulating potential energy and the second sliding sleeve 138 is further slid into the first sliding sleeve 136. The first and the second sliding sleeves 136, 138 are respectively rotated relative to the first and pivot shaft 132, 134. When the first sheet 11 reaches a middle position of the second sheet 12, the spring 139 is compressed to a shortest length and the second sliding sleeve 138 is fully slid into the first sliding sleeve 136. Since the first sheet 11 passes the middle position of the second sheet 12, the potential energy of the spring 139 creates an elastic force to push the first sheet 11 to slide further until the first sheet 11 is fully opened relative to the second sheet 12. The process of closing the display unit with the first sheet 11 and the above-described opening process are substantially in the same manner.

However, the spring 139 is compressed to a shortest length in the middle position and creates a largest force to the first sheet 11 when passing the middle position, thus the first sheet 11 wobbles along with the slide mechanism. Therefore, the sliding first sheet 11 does not slide stably relative to the second sheet 12. In addition, the first and the second sliding sleeves 136, 138 occupy extra volume in the slide mechanism, thus increasing a thickness of the slide mechanism. Furthermore, the process of closing the display unit with the first sheet 11 is achieved by manually pushing the display unit with the first sheet 11, thus making it inconvenient to operate the typical slide-type terminal device using the typical slide mechanism.

Therefore, a new slide mechanism is desired to overcome the above-described shortcomings.

SUMMARY

A slide mechanism includes a rear cover, a front cover slidably attached to the rear cover, a resilient member for creating an elastic force to make the front cover slide relative to the rear cover, and an operating module. The resilient member is connected between the rear cover and the front cover. The operating module includes a first latching member rotatably connected to the rear cover, a tension spring, an operating member, and a second latching member fixed to the front cover. The tension spring includes a first end connected to the rear cover and a second end connected to a side of the first latching member. The operating member is sleeved by the tension spring and includes a pressing portion at an end for pressing the first latching member to rotate. The second latching member is latched with the first latching member after the first latching member is rotated by an elastic force created by the tension spring and unlatched with the latching member after the latching member is rotated by the operating member.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the slide mechanism. Moreover, in the drawings, like reference numerals designate corresponding parts throughout the several views.

DETAILED DESCRIPTION

Figure 1:
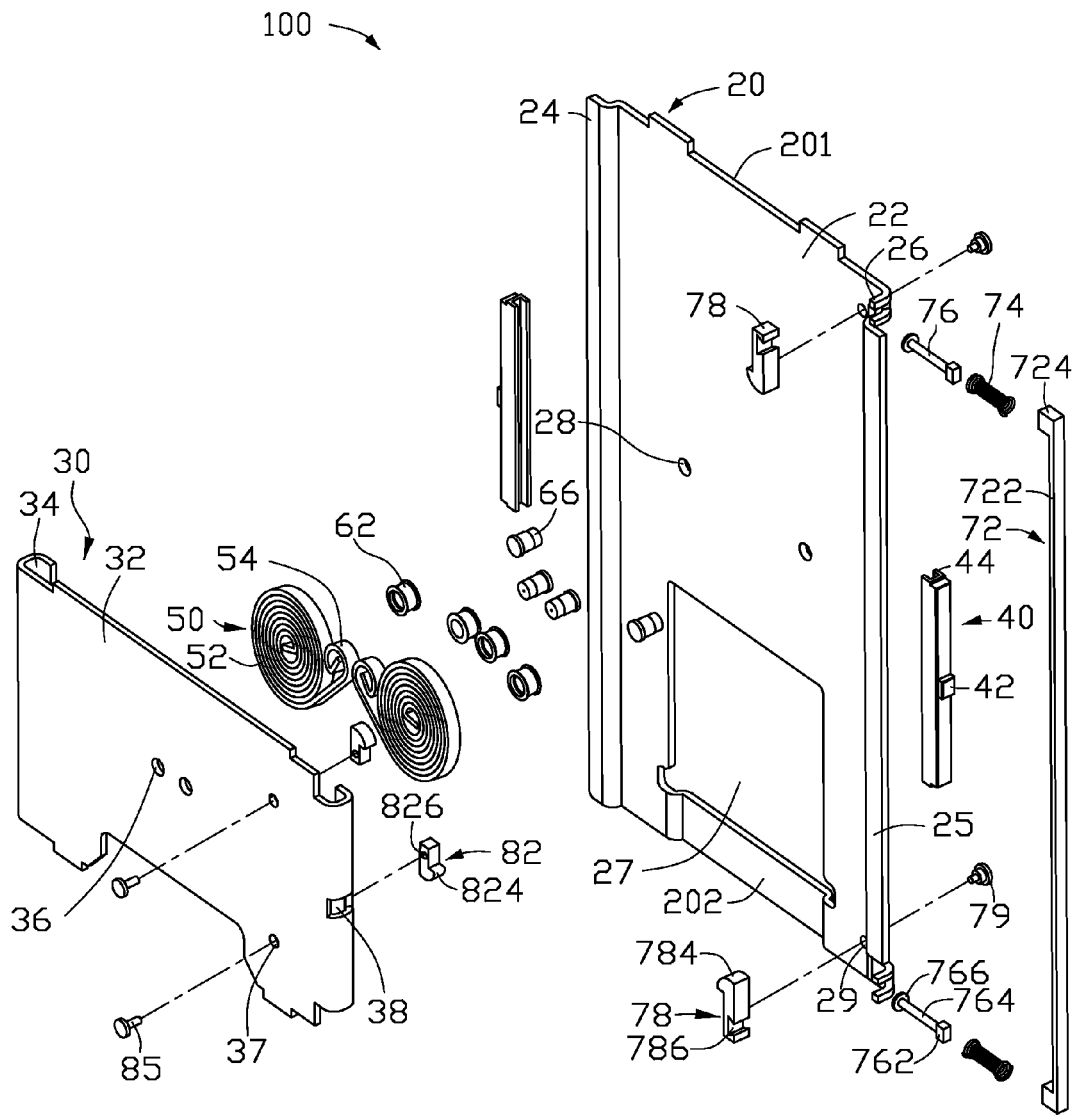
FIG. 1 is an exploded, isometric view of an embodiment of a slide mechanism of the disclosure.
Figure 2:
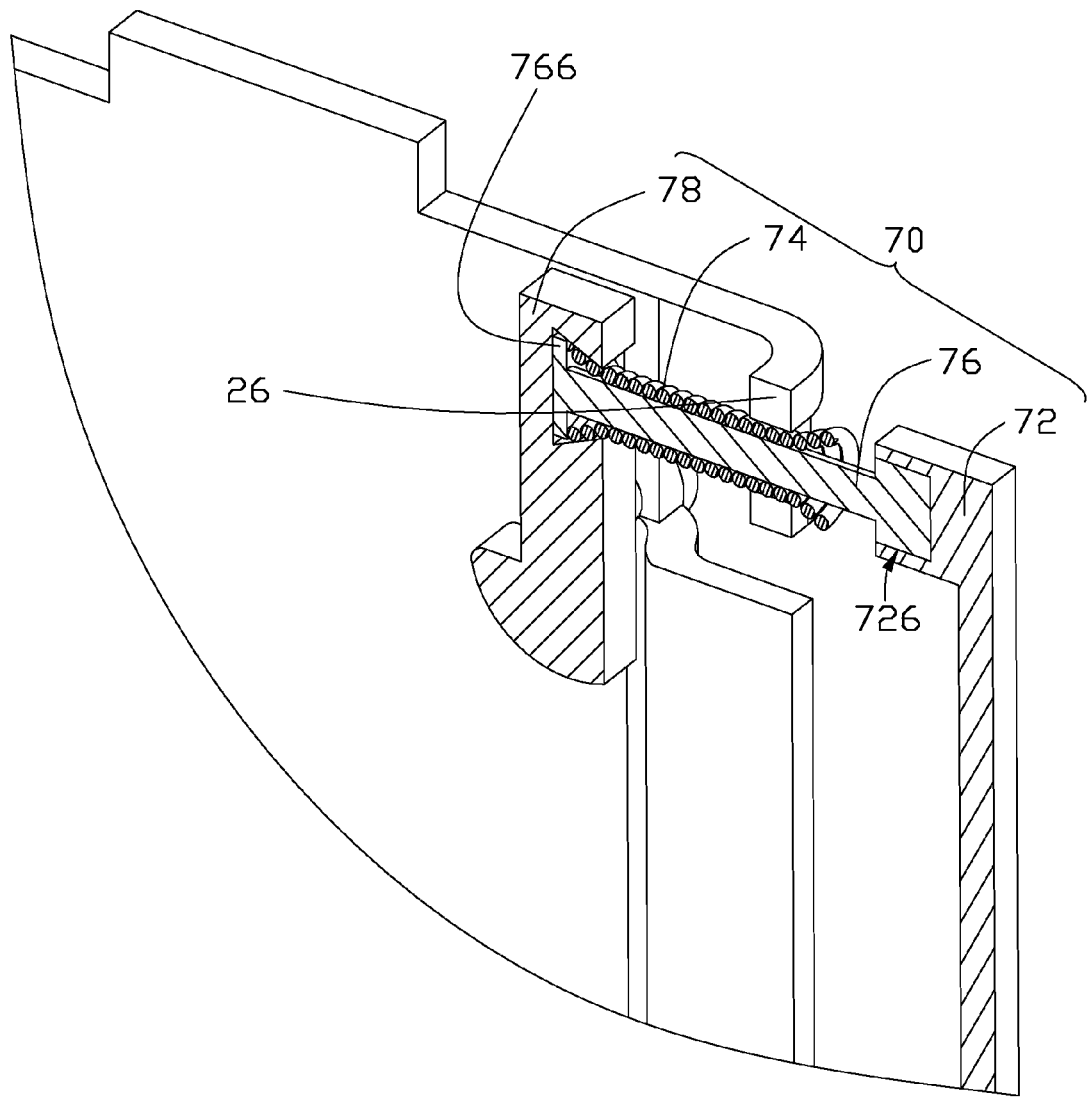
FIG. 2 is a partial, enlarged, cross-sectional view of the slide mechanism of FIG. 1.

Referring to FIGS. 1 and 2, an embodiment of a slide mechanism 100 is shown for use in a slide-type terminal device such as a slide-type mobile phone. The slide mechanism 100 includes a rear cover 20, a front cover 30, two guiding rails 40, a pair of coil springs 50, and an operating module 70. The rear cover 20 and the front cover 30 are configured to be fixed on a main unit (not shown) and a display unit (not shown) of the slide-type terminal device such that the display unit can be slidably attached to the main unit.

The rear cover 20 may be substantially rectangular shaped. The rear cover 20 includes a main plate 22, a first side strip 24, and a second side strip 25 extending along opposite sides of the main plate 22, and two end portions 201, 202 formed at opposite ends of the main plate 22. The first side strip 24 and a second side strip 25 may be formed by bending opposite side portions of the main plate 22 towards a same side of the rear cover 20. Two restricting portions 26 are formed on the main plate 22 adjacent to opposite ends of the second side strip 25. Each restricting portion 26 is substantially perpendicular to the main plate 22. The main plate 22 further defines a rectangular hole 27 adjacent to an end, two circular pinholes 28 in a middle portion of the main plate 22, and two restricting holes 29 in a side portion of the main plate 22. Each pinhole 28 is adjacent to one of the first and second side strips 24, 25 and each restricting hole 29 is adjacent to each restricting portion 26.

The front cover 30 may be substantially rectangular shaped flat sheet and having a base 32 and two sliding grooves 34 defined in opposite ends of the base 32. The sliding grooves 34 are configured for engaging with corresponding guiding rails 40. The front cover 30 defines two pinholes 36 in a middle portion and two fixing holes 37 adjacent to a side of the front cover 30. Each sliding groove 34 may be formed by bending a side portion of the base 32 inwards. The front cover 30 further defines a fixing hole 38 in a middle of each side portion and the fixing hole 38 communicates with the corresponding sliding groove 34.

Each guiding rail 40 may be substantially an elongated bar. A protrusion 42 is formed in a middle portion of each guiding rail 40. Each guiding rail 40 further defines a guiding groove 44. The protrusion 42 and the guiding groove 44 are at opposite sides of each guiding rail 40. The guiding grooves 44 are configured for engaging with the corresponding first and second side strips 24, 25 of the rear cover 20, so that the guiding rails 40 can slidably engage with the rear cover 20. The guiding rails 40 are securely received in the sliding grooves 34, with the protrusions 42 engaging in the fixing holes 38 of the front cover 30.

Figure 4:
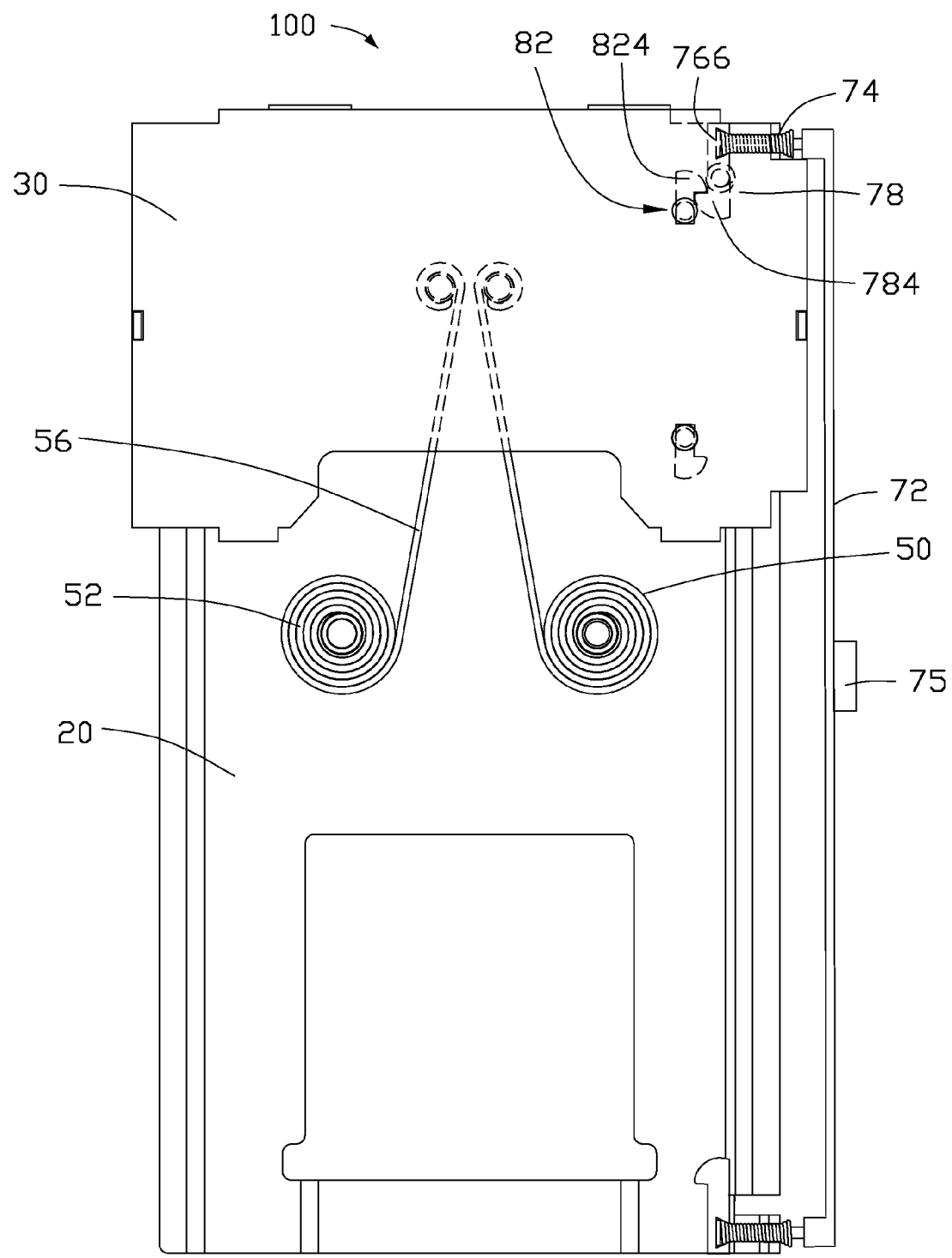
FIG. 4 is an assembled, top view of the slide mechanism of FIG. 1, showing a first open state of the slide mechanism of the disclosure.

Each coil spring 50 is formed by coiling an elastic strip along a predetermined coiling axis. Each coil spring 50 includes a coiled portion 52, a free portion 54, and a connecting portion 56 (shown in FIG. 4) interconnecting the coiled portion 52 and the free portion 54. The coiled portion 52 can be pulled out by the connecting portion 56, thereby elongating the connecting portion 56. The connecting portion 56 creates a substantially stable elastic force when the coiled portion 52 is pulled out to a predetermined extending range.

The operating module 70 includes a link shaft 72, two tension springs 74, two operating members 76, and a pair of first latching members 78, and a pair of second latching members 82.

The link shaft 72 includes a shaft portion 722, two link portions 724 extending from opposite ends of the shaft portion 722, and a key-press 75 (see FIG. 3) fixed on a middle of the shaft portion 722. Each link portion 724 defines a latching groove 726 (see FIG. 2).

The tension spring 74 are helical springs. A diameter of each end of each tension spring 74 is larger than a diameter of a middle portion of each tension spring 74.

Each operating member 76 includes a latching portion 762, a mounting shaft 764, and a pressing portion 766. The latching portion 762 and the pressing portion 766 are positioned at opposite ends of the mounting shaft 764. The latching portion 762 is configured to be latched in the latching groove 726 of each link portion 724. The mounting shaft 764 is configured to be sleeved by one of the tension springs 74. A diameter of the pressing portion 766 is larger than a diameter of an end of each tension spring 74, thus preventing the tension spring 74 from falling off the pressing portion 766.

Each first latching member 78 includes a hook portion 784 at a first end and defines a restricting groove 786 adjacent to a second end opposite to the first end. The restricting groove 786 is a dovetail groove for holding the pressing portion 766 of one of the operating members 76 and an end of one of the tension springs 74. Each first latching member 78 defines a pivot hole (not labeled) in a middle portion for receiving a pivot shaft 79.

Each second latching member 82 is similar in shape to the first latching member 78. A latching portion 824 is formed at an end of each second latching member 82 and a rivet hole 826 is defined in a middle portion of each latching member 82. The rivet hole 826 corresponds to one of the pinholes 37 of the front cover 30. The second latching member 82 can be fixed to the front cover 30, with a rivet 85 received in the front cover 30 and one of the pinholes 37 of the front cover 30.

The slide mechanism 100 further includes four coil wheels 62, and four rivets 66. Each coil wheel 62 defines a through hole (not labeled) in a middle portion of the coil wheel 62, and includes a cylindrical outer surface. Each rivet 66 is substantially cylindrical-shaped and is capable of inserted though the through hole of each coil wheel 62.

Figure 3:
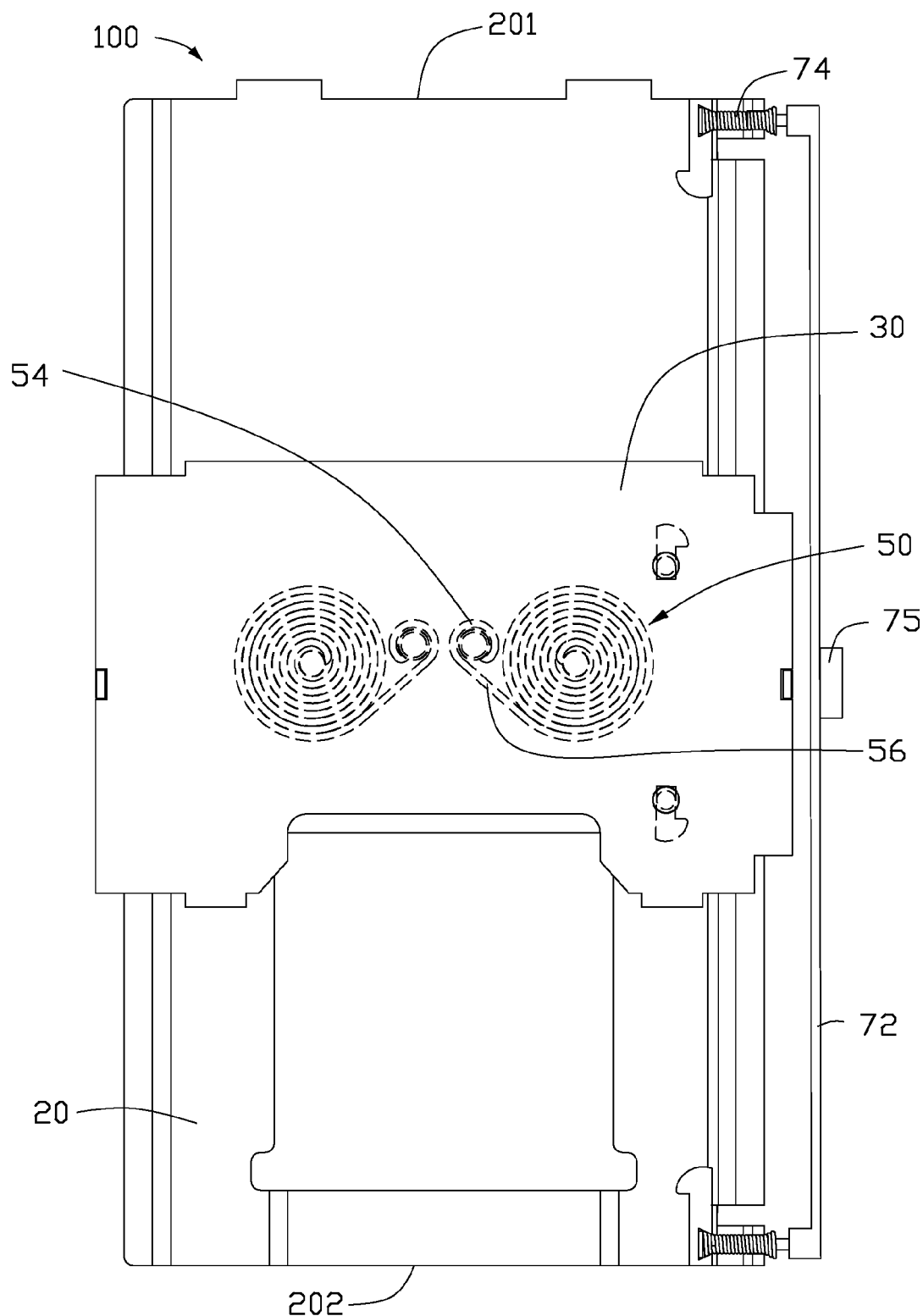
FIG. 3 is an assembled, top view of the slide mechanism of FIG. 1, showing a closed state of the slide mechanism of the disclosure.

Referring to FIG. 3, the slide mechanism 100 may be assembled as follows. The coiled portion 52 and the free portion 54 of each coil spring 50 are respectively coiled on the cylindrical outer surfaces of two coil wheels 62. A first rivet of the rivets 66 is rotatably inserted through the through hole of the coil wheel 62 coiled by the coiled portion 52 and the pinhole 28, and an end of the first rivet is riveted to the rear cover 20. Thus, the coiled portion 52 of one coil spring 50 is rotatably connected to the rear cover 20. Similarly, the coiled portion 52 of another coil spring 50 may also be rotatably connected to the rear cover 20 by a second rivet of the rivets 66. The guiding rails 40 are fixedly received in the corresponding sliding grooves 34 of the front cover 30. The first and second side strips 24, 25 are received in corresponding guiding grooves 44 of the guiding rails 40, thereby slidably mounting the front cover 30 and the guiding rails 40 to the rear cover 20. A third rivet of the rivets 66 is rotatably inserted through the through hole of the coil wheel 62 coiled by the free portion 54 and the pinhole 36, and an end of the third rivet is riveted to the front cover 30. Thus, the free portion 54 of one coil spring 50 is rotatably connected to the front cover 30. Similarly, the free portion 54 of another coil spring 50 may also be rotatably connected to the front cover 30 by a fourth rivet of the rivets 66.

To assemble the operating module 70, the pivot shaft 79 is inserted through the restricting hole 29 of the rear cover 20 and the pivot hole of one of the first latching members 78, and an end of the pivot shaft 79 is riveted to the front cover 30. Thus, one of the first latching members 78 is rotatably connected to the rear cover 20 adjacent to the end portion 201. The mounting shaft 764 of one of the operating members 76 is sleeved by one of the tension springs 74, and the tension spring 74 is positioned between the latching portion 762 and the pressing portion 766. The pressing portion 766 of one of the operating members 76 together with a first end of one of the tension springs 74 are received in the restricting groove 786 of the first latching member 78. Another one of the first latching members 78, another one of the operating members 76, and another one of the tension springs 74 may be similarly assembled to the rear cover 20 adjacent to the end portion 202. The link shaft 72 is attached to the operating members 76, with latching portions 762 of the operating members 76 latched in the latching grooves 726 of the link shaft 72. In the illustrated embodiment, the tension springs 74 are extended slightly to provide a slight resistance force.

Referring to FIG. 3, when the slide mechanism 100 is in a closed state, the front cover 30 is positioned in a middle portion of the rear cover 20 and the coil springs 50 are in a coiled state. A length of the connecting portion 56 is at a shortest length in the closed state. To change from the closed state to a first open state, the front cover 30 is manually moved from the middle portion to the end portion 201 of the rear cover 20. When moving the front cover 30, the coiled portion 52 of the coil spring is gradually pulled out by the connecting portion 56 and becomes uncoiled until the slide mechanism 100 is in the first open state shown in FIG. 4, and the second latching member 82 is gradually moved near the first latching member 78. Once the latching portion 824 of the second latching member 82 abuts the hook portion 784 of the first latching member 78, the front cover 30 is moved further until the latching portion 824 pushes the first latching member 78 to rotate a determined angle from an original position and extend the extension spring 74. If the latching portion 824 is moved across the hook portion 784, an elastic force created by the extended extension spring 74 pushes the first latching member 78 to rotate and return to the original position, thus the latching portion 824 of the second latching member 82 is latched by the hook portion 784 of the first latching member 78. In the first open state of FIG. 4, the front cover 30 is fully opened relative to the rear cover 20, and the length of the connecting portion 56 of spring coil 50 is at a longest length.

To change from the first open state to the closed state, the key-press 75 of the link shaft 72 is pressed to push the pressing portion 766 of the operating member 76. Thus, the first latching member 78 is rotated by the pressing portion 766 of the operating member 76 so that the latching portion 824 of the second latching member 82 becomes unlatched from the hook portion 784 of the first latching member 78. The front cover 30 is automatically moved to the closed position by an elastic force created by the coiled spring 50 until the slide mechanism 100 returns to the closed state of FIG. 3.

Figure 5:
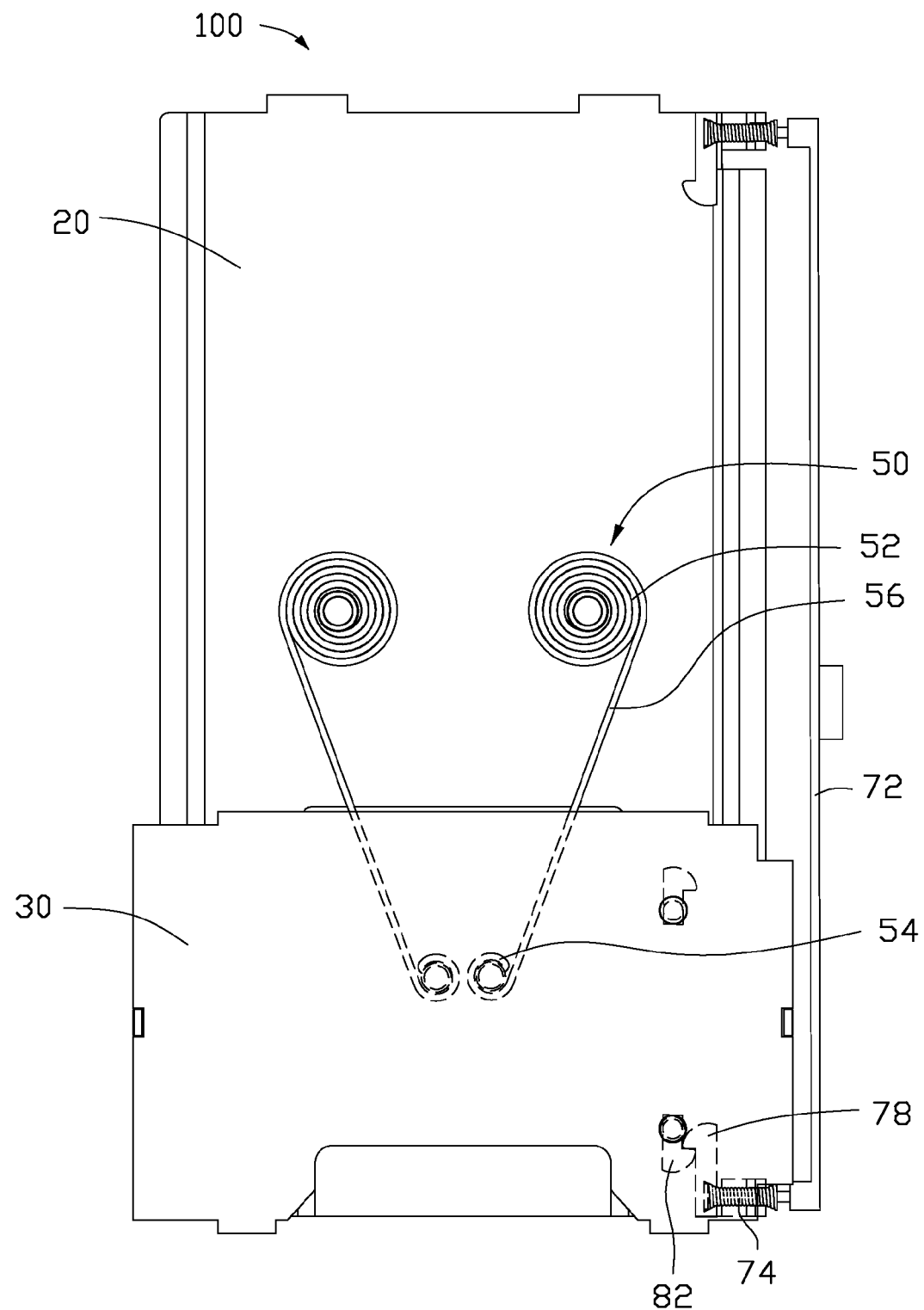
FIG. 5 is similar to FIG. 4, but showing a second open state of the slide mechanism of the disclosure.
Figure 6:
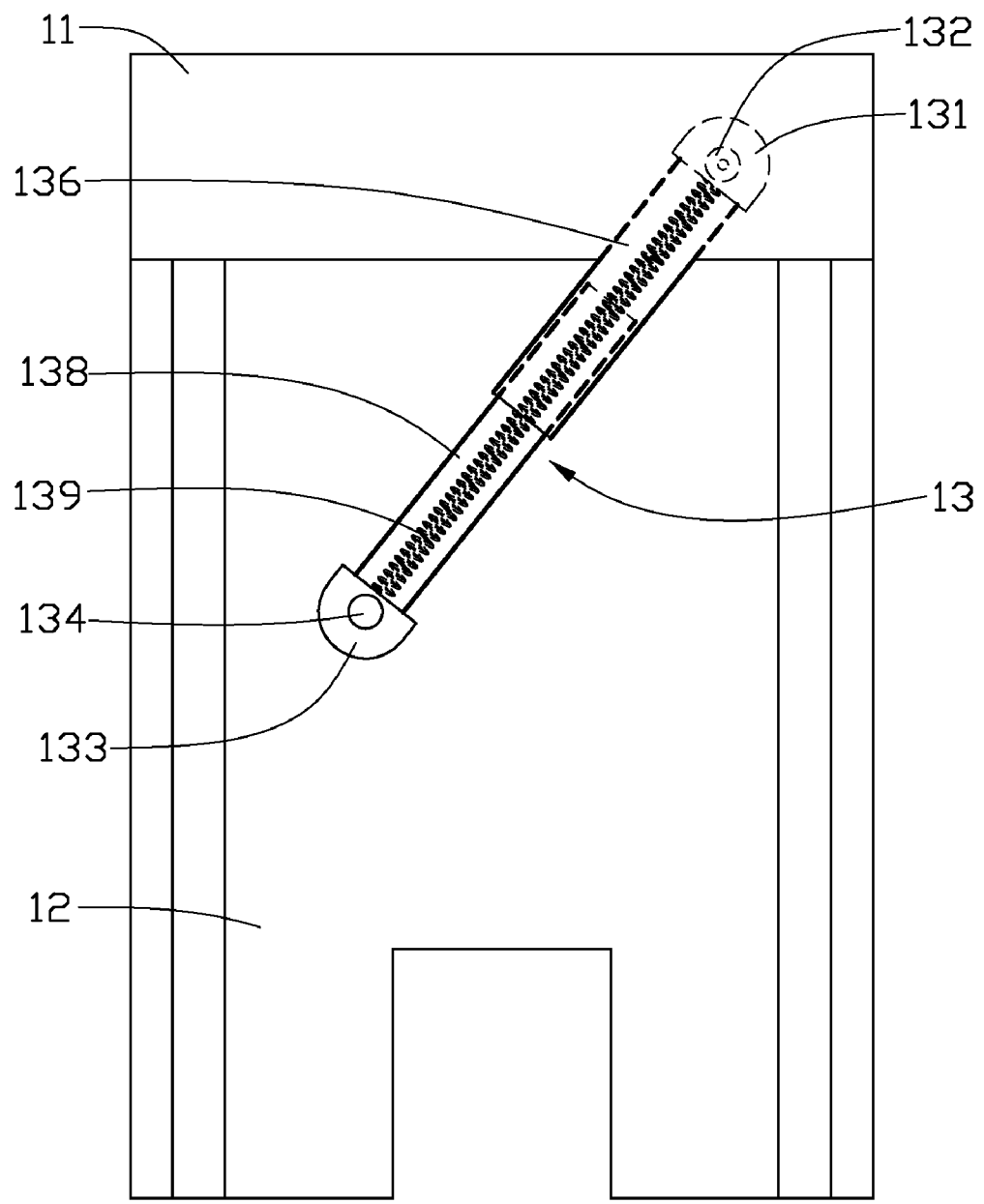
FIG. 6 is a schematic view of a typical slide mechanism.

To change from the closed state to a second open state, the front cover 30 is manually moved from the middle portion to the end portion 202 of the rear cover 20 until the slide mechanism 100 is in the second open state of FIG. 5. The principle of changing from the closed state to the second open state is similar to the principle of switching from the closed state to the first open state.

The elastic force created by the coil spring 50 is substantially stable when the coiled portion 52 is pulled out in the predetermined extending range, thus the first sheet 11 hardly wobbles with the slide mechanism 100. Therefore, the sliding first sheet 11 slides stably relative to the second sheet 12. In addition, the coil spring 50 does not need to be mounted in an extra sliding sleeve, thus the slide mechanism 100 has a relatively small thickness. Furthermore, the front cover 30 is automatically moved to the closed position by pressing the key-press 75 of the link shaft 72, thus it is convenient to operate the slide-type terminal device using the slide mechanism 100.

It should be pointed out that, the second latching member 82 may be integrally formed on the front cover 30. The key-press 75 and the link shaft 72 may be omitted, thus the front cover 30 is automatically moved to the closed position by pressing the latching portion 762 of the operating member 76. If the slide-type terminal device using the slide mechanism 100 has only one open state, the slide mechanism 100 will have only one open state. Thus, the slide mechanism 100 may include one tension spring 74, one operating member 76, and one first latching member 78, and one second latching member 82 when the slide mechanism 100 have only one open state. The coil springs 50 may be replaced by other resilient members such as tension springs. The number of the coil springs 50 may be one.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A slide mechanism, comprising:
   a rear cover;
   a front cover slidably attached to the rear cover;
   a resilient member connected between the rear cover and the front cover for creating an elastic force to make the front cover slide relative to the rear cover; and
   an operating module comprising:
      a first latching member rotatably connected to the rear cover,
      a tension spring having a first end connected to the rear cover and a second end connected to a side of the first latching member;
      an operating member sleeved by the tension spring, comprising a pressing portion at an end thereof for pressing the first latching member to rotate; and
      a second latching member fixed to the front cover, the second latching member being latched with the first latching member after the first latching member is rotated by an elastic force created by the tension spring or being unlatched with the latching member after the latching member is rotated by the operating member.

2. The slide mechanism as claimed in claim 1, wherein the resilient member is a coiled spring comprising a coiled portion connected to the front cover, a free portion connected to the front cover, and a connecting portion interconnecting the coiled portion and the free portion.

3. The slide mechanism as claimed in claim 1, wherein the first latching member comprises a hook portion at a first end thereof and defines a restricting groove adjacent to a second end opposite to the first end for holding the pressing portion of the operating member and the second end of the tension spring, and the second latching member comprises a latching portion at an end for latching with the hook portion.

4. The slide mechanism as claimed in claim 3, wherein the restricting groove is a dovetail groove.

5. The slide mechanism as claimed in claim 1, wherein the operating member comprises a mounting shaft extending from the pressing portion, and the tension spring is sleeved on the mounting shaft.

6. The slide mechanism as claimed in claim 1, wherein the rear cover comprises a main plate, and two side strips extending along opposite sides of the main plate, and a restricting portion is formed adjacent to an end of one of the side strip, the first end of the tension spring is connected to the restricting portion.

7. The slide mechanism as claimed in claim 6, wherein the slide mechanism further comprises two guiding rails, each of the guiding rails defines a guiding groove, and the side strips of the rear cover slidably engage in the guiding grooves of the guiding rails.

8. The slide mechanism as claimed in claim 7, wherein each of the guiding rails is an elongated bar.

9. The slide mechanism as claimed in claim 7, wherein the front cover is a flat sheet having a base and two sliding grooves defined at opposite ends of the base; the guiding rails are securely received in the sliding grooves.

10. The slide mechanism as claimed in claim 9, wherein each of the sliding grooves is formed by bending a side portion of the base inwards; the front cover defines a fixing hole in a middle of each side portion communicating with the corresponding sliding groove; a protrusion is formed in a middle portion of each of the guiding rails for engaging in its corresponding fixing hole.

11. A slide mechanism, comprising:
a rear cover having a main plate and two side strips formed at opposite sides of the main plate;
a front cover slidably attached to the rear cover;
two coil springs configured for creating an elastic force to make the front cover slide relative to the rear cover, each coil spring comprising a coiled portion connected to the front cover fixed to the front cover, a free portion connected to the rear cover, and a connecting portion interconnecting the coiled portion and the free portion; and
an operating module comprising:
a pair of first latching members rotatably connected to opposite ends of the main plate adjacent one of the side strips of the rear cover,
two tension springs, each tension spring comprising a first end connected to the rear cover and a second end connected to a side of the first latching member;
two operating members, each operating member sleeved by one of the tension springs and comprising a pressing portion at an end for pressing one of the first latching members to rotate; and
a pair of second latching members fixed adjacent to opposite ends of the front cover, each of the second latching members being latched with one of the first latching members after one of the first latching members is rotated by an elastic force created by one of the tension springs or being unlatched with one of the latching members after one of the latching members is rotated by the operating member.

12. The slide mechanism as claimed in claim 11, wherein the operating module further comprises a link shaft having a shaft portion and two link portions extending from opposite ends of the shaft portion, wherein each operating member further comprises a latching portion formed at another end opposite to the pressing portion, the latching portions of the operating members are fixed to the link portions of the link shaft.

13. The slide mechanism as claimed in claim 12, wherein the link shaft further comprises a key-press fixed on a middle of the shaft portion.

14. The slide mechanism as claimed in claim 12, wherein each link portion defines a latching groove, and the latching portions of the operating members are latched in the latching grooves of the link portion.

15. The slide mechanism as claimed in claim 11, wherein each first latching member comprises a hook portion at a first end thereof and defines a restricting groove adjacent to a second end opposite to the first end for holding the pressing portion of each operating member and the second end of each tension spring, and each second latching member comprises a latching portion at an end for latching with the hook portion.

16. The slide mechanism as claimed in claim 15, wherein the restricting groove is a dovetail groove.

17. The slide mechanism as claimed in claim 11, wherein each operating member further comprises a mounting shaft extending from the pressing portion; each tension spring is sleeved on the mounting shaft; two restricting portions are formed adjacent to opposite ends of one of the side strips; the first end of each tension spring is connected to one of the restricting portions.

18. The slide mechanism as claimed in claim 11, wherein the slide mechanism further comprises two guiding rails, each guiding rail defines a guiding groove; the strips of the rear cover slidably engage in the guiding grooves of the guiding rails.

19. The slide mechanism as claimed in claim 18, wherein the front cover is a flat sheet having a base and two sliding grooves defined at opposite ends of the base, the guiding rails are securely received in the sliding grooves.

20. The slide mechanism as claimed in claim 19, wherein each of the sliding grooves is formed by bending a side portion of the base inwards; the front cover defines a fixing hole in a middle of each side portion communicating with the corresponding sliding groove; a protrusion is formed in a middle portion of each of the guiding rails for engaging in the corresponding fixing hole.

* * * * *